June 27, 1961 R. P. DE NEUI ET AL 2,990,081
APPLICATION OF TAPE TO MOVING OBJECTS
Filed Sept. 26, 1957 3 Sheets-Sheet 1
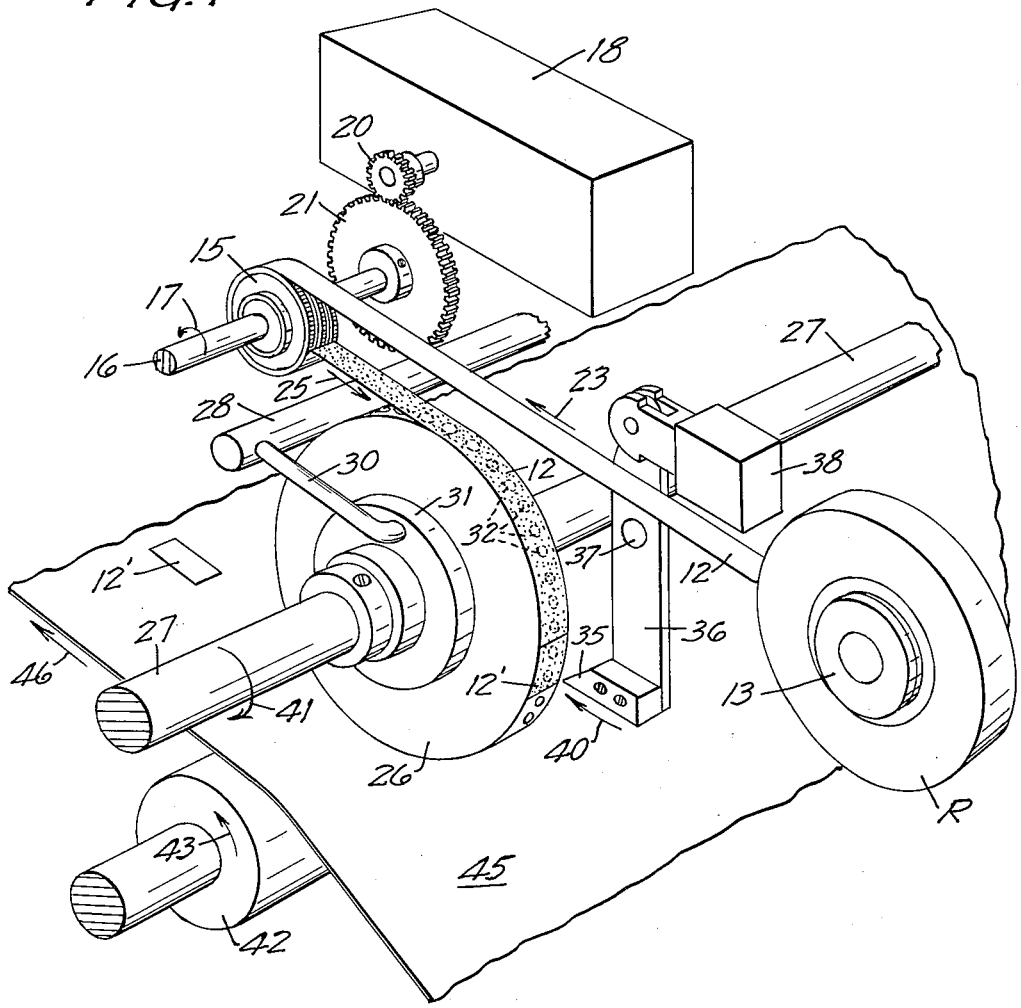
FIG. 1
FIG. 3
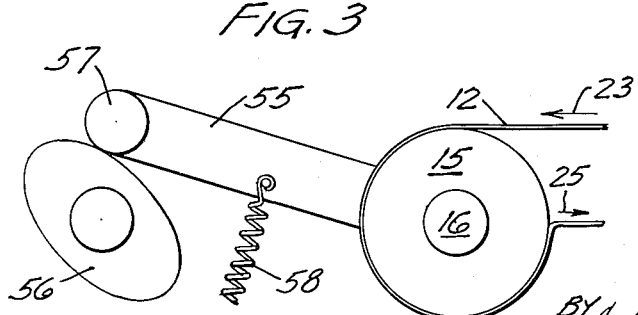
INVENTORS
RICHARD P. DE NEUI
ARTHUR C. DICKERSON
JAMES H. CASEY
WALTER C. LARSEN
BY
ATTORNEYS

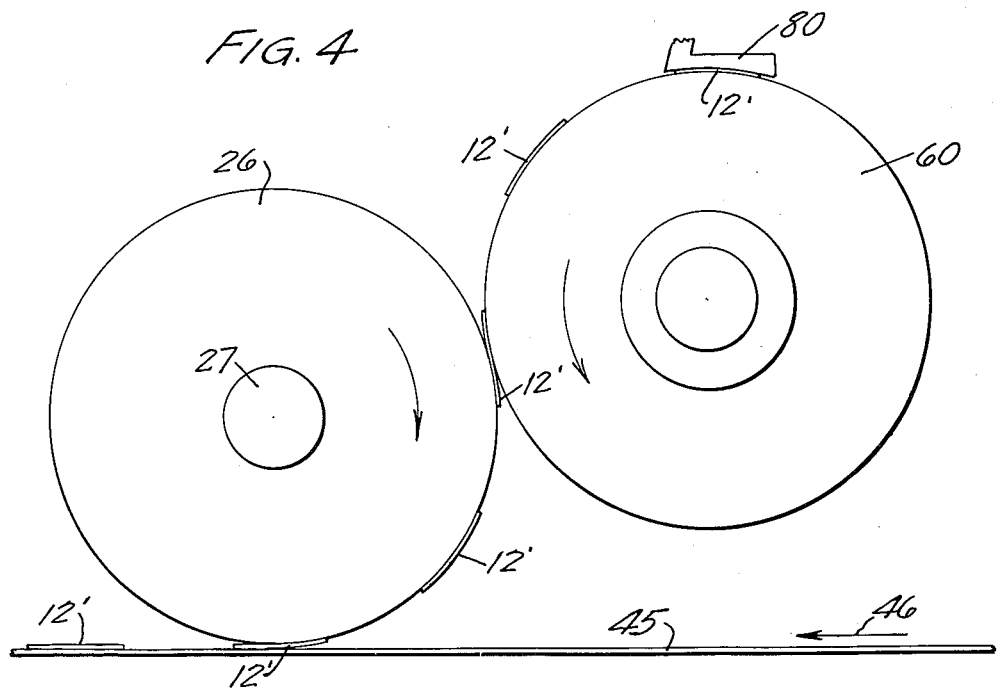
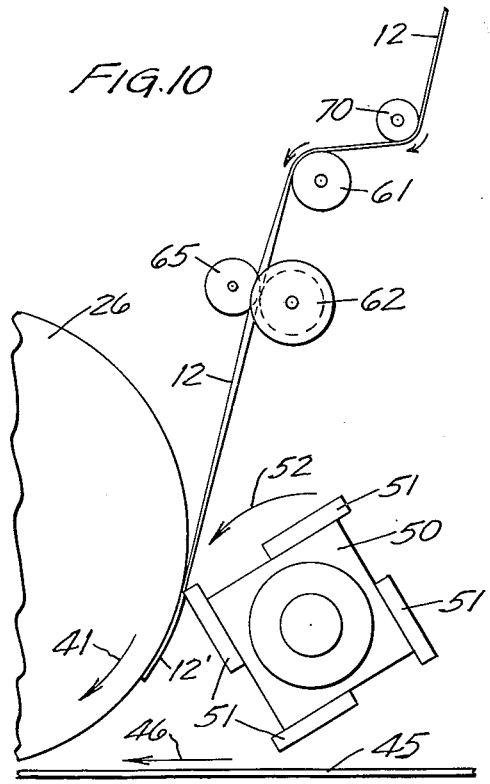
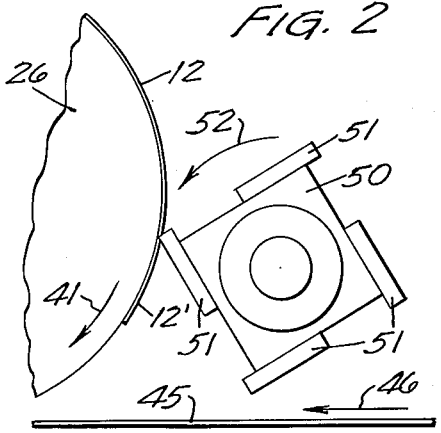

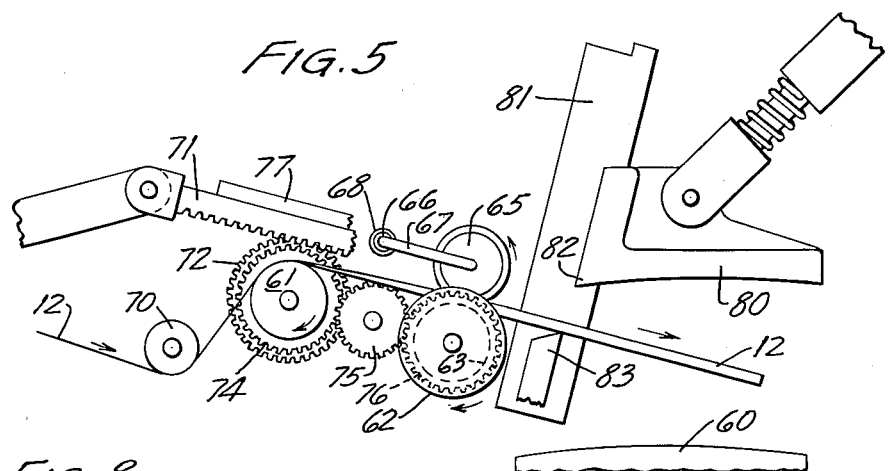
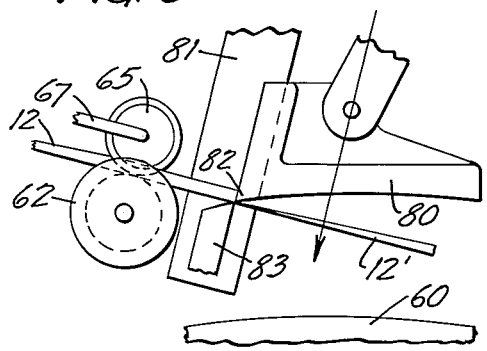
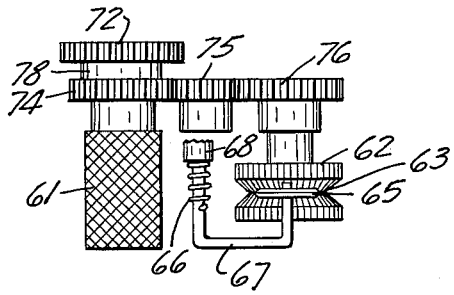
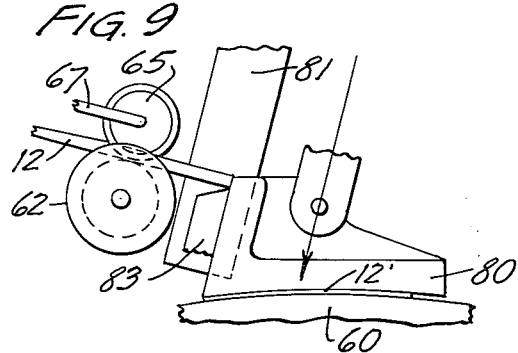
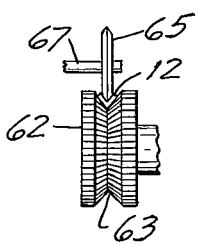
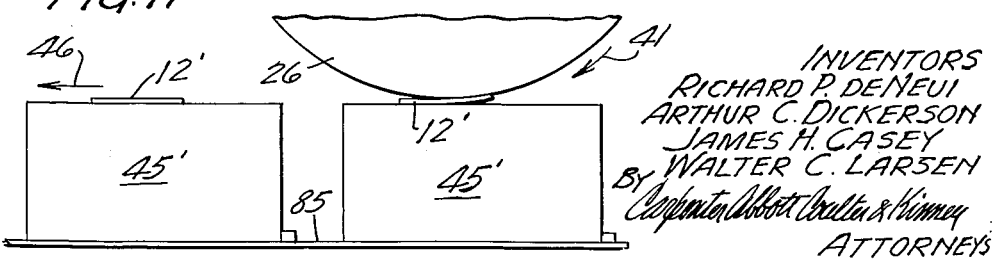

United States Patent Office 2,990,081
Patented June 27, 1961

2,990,081
APPLICATION OF TAPE TO MOVING OBJECTS
Richard P. De Neui, East Oakdale Township, Washington County, Arthur C. Dickerson, St. Paul, James H. Casey, Roseville Township, Ramsey County, and Walter C. Larsen, Minneapolis, Minn., assignors to Minnesota Mining and Manufacturing Company, St. Paul, Minn., a corporation of Delaware
Filed Sept. 26, 1957, Ser. No. 686,346
3 Claims. (Cl. 216—21)

The present invention relates to the application of lengths of adhesive tape to the surface of an object or article; particularly to the removal and severance of lengths of normally tacky pressure-sensitive adhesive tape from commercial supply rolls thereof, and the application of such lengths.

One objective is to provide a machine capable of severing and applying a predetermined length of tape to an article that is in continuous motion, the length to be applied to a single surface, e.g., to the central portion of the flat top surface of the article (as distinguished from a length that passes around the corner or edge of an article so as to be adhered to two or more adjoining surfaces).

A further objective is to provide a machine capable of severing and applying a succession of predetermined lengths at predetermined intervals to the surface of a continuously moving web.

A further objective is to provide machines that have the said capacities and which in addition are capable of operating at relatively high speeds, i.e., the lengths to be applied in rapid succession and/or the object or objects to be moving rapidly.

A machine that attains these and other objectives is provided by the present invention, the said machine being characterized by a rotatably mounted tape applying wheel, and vacuum means operative within the wheel to hold the severed length against the peripheral surface of the wheel adhesive side out, the tape being transferred to the article when the article and the wheel bear against each other at a tape applying station with the tape between them.

Illustrative embodiments are described herein and shown in the accompanying drawings in which:

FIGURE 1 is a perspective view of a machine according to the present invention;

FIGURE 2 shows an alternative form of severing means;

FIGURE 3 shows an alternative means for intermittently rotating the tape withdrawing and advancing drum;

FIGURE 4 is a side elevation of an alternative form of the machine of FIGURE 1;

FIGURES 5, 6, 7, 8 and 9 show a mechanism for supplying the severed lengths of tape in the machine of FIGURE 4;

FIGURE 10 is a side elevation of a further alternative form of the machine of FIGURE 1; and FIGURE 11 shows the application of lengths of tape to cartons.

Referring to FIGURE 1, a supply roll R of normally tacky pressure-sensitive adhesive tape 12 is mounted on a freely rotatable hub 13. The tape extends forwardly adhesive side down, to a tape withdrawing and advancing drum 15 which is fixed on a rotatable shaft 16. The shaft 16 is rotated in the direction of the arrow 17 by a motor and single revolution clutch unit 18 through a small driving gear 20 and a large driven gear 21.

The unit 18 operates in a well known manner to turn the driving gear 20 through a single revolution upon electrical actuation. When the tape is trained around the drum 15 in adhesive contact with the grooved and knurled peripheral surface of the drum, the said revolution of the gear 20 produces a withdrawal in the direction of the arrow 23 and an advancement in the direction of the arrow 25 of a predetermined length of tape. By changing the sizes of the gear 20, the gear 21 and/or the drum 15, various lengths of tape may be withdrawn and advanced, as desired.

A tape applying wheel 26 is fixed on a rotatable shaft 27.

The tape roll hub 13, the tape withdrawing and advancing drum 15 and the tape applying wheel 26 are in alignment and their axes are parallel.

The wheel 26 is equipped in a well known manner with a vacuum means that is operative within the wheel to draw the tape 12 against the peripheral surface of the wheel when the tape is trained around it. A vacuum source (not shown) operates through a manifold 28, a pipe 30 and a distributor 31, to create a suction in the interior of the wheel that acts on the tape through openings 32 in the rim of the wheel.

A knife 35 is fixed on the free lower end of a vertical arm 36 that pivots at 37. The upper end of the arm 36 is attached to the plunger of a solenoid 38. Actuation of the solenoid 38 moves the knife 35 forwardly in the direction of the arrow 40 through a cutting stroke, bringing the edge of the knife into contact with the peripheral surface of the wheel 26 and thereby severing the tape 12 that is trained around the wheel at a point on the tape between the leading end and the point where the advanced length first contacts the wheel, to form the severed length 12'. The knife 35 is returned to its normal position shown in FIGURE 1, by a spring means (not shown) upon de-actuation of the solenoid 38.

The shaft 27 on which the wheel 26 is fixed, is continuously rotated in the direction of the arrow 41 by a power means not shown, thereby rotating the wheel in the same direction. Except when actuated to turn the gear 20, the motor and single revolution clutch unit 18 normally holds the gears 20 and 21 and the tape withdrawing and advancing drum 15 fixed, so that the advanced unsevered length of tape 12 that is trained around the wheel 26 is normally motionless notwithstanding the turning of the wheel 26 and the suction through the openings 32. The wheel 26 slips around inside the tape. When the length 12' of the tape is severed however, and thereby freed from the restraint of the temporarily fixed drum 15, the suction or vacuum within the wheel acts upon the severed length 12' through the openings 32 to hold the length fixed against the peripheral surface of the wheel, whereupon the length is carried by the wheel to the tape applying station.

Below the wheel 26 and in peripheral contact therewith, is a roller 42, the axes of the wheel and the roller being parallel. The roller is continuously rotated in the direction of the arrow 43 by a power means not shown.

The article to a surface of which the length 12' of tape is to be applied, is here shown as a continuous sheet or web 45 of waxed paper which passes between the wheel 26 and the roller 42 whereby it is propelled in the direction of the arrow 46.

When the severed length 12' of the tape is carried by the wheel 26 following the severance of the length, the length is transferred to the upper surface of the web 45 and adhered thereto when the web and the wheel bear against each other with the length of tape between them. The point or location where the web and the wheel bear against each other and the transfer and application of the length of tape takes place, is thus referred to herein as the "tape applying station."

The intermittent rotation of the tape withdrawing and advancing drum 15, and the cutting strokes of the knife 35, are in timed relation to the movement of the web 45.

FIGURE 2 shows an alternative form of tape severing means, wherein a cutter wheel 50 equipped with a series of blades 51 is rotated in the direction of the arrow 52, the cutting edges of the blades bearing against the peripheral surface of the wheel 26 with the tape 12 between them. When such a cutter wheel is used in place of the knife 35 in a mechanism that is otherwise constructed as shown in FIGURE 1, the cutter wheel is rotated periodically, in timed relation to the movement of the article 45; or, alternatively, the cutter wheel 50 may be rotated continuously in the said timed relation. Preferably however, when such a cutter wheel is used, both the tape withdrawing and advancing drum 15 and the cutter wheel 50 are rotated continuously, resulting in a continuous feed of the tape 12 to the applying wheel 26 with the periodic supply of the severed lengths 12' being then timed in relation to the movement of the web 45 by the speeds of the drum 15 and the wheel 50, the cutting edges of the blades 51 being circumferentially spaced around the wheel 50 at distances equal to the desired length of the severed lengths 12' of tape. This latter arrangement permits an elimination of the motor and single revolution clutch unit 18.

FIGURE 3 shows an alternative means for securing intermittent rotation of the tape withdrawing and advancing drum 15. The drum 15 is fixed to the rotatable shaft 16. A cam arm 55 is attached to the shaft 16 through a ratchet means (not shown). The ratchet is adjusted to produce a rotation of the drum 15 in the direction of the arrow 17 when the outer free end of the arm 55 moves downwardly through a tape advancing stroke, but to impart no impulse to the drum when the arm moves upwardly through its return stroke. The downward and upward movement or oscillation of the arm 55 is produced by a continuously rotating elliptical cam 56 and a cam follower 57 on the outer free end of the arm that bears downwardly against the cam by virtue of the weight of the arm and/or a spring 58.

FIGURE 4 shows an alternative form of the machine wherein the tape is supplied to the peripheral surface of the vacuum tape applying wheel 26 in the form of previously severed lengths 12' that are temporarily adhered to the peripheral surface of a transfer wheel 60. The peripheral surfaces of the wheels 26 and 60 are in contact, and the peripheral surface of the wheel 60 is treated (knurled in the present embodiment) so as to have an affinity for the adhesive surface of the tape that is sufficiently low to enable the vacuum wheel to draw the lengths 12' to itself and out of adhesive contact with the transfer wheel 60. As an alternative to knurling, a layer of abrasive particles or abrasive sheet material (sandpaper) may be permanently bonded to the peripheral surface of the wheel 60.

A tape feed that employs the tape withdrawing and advancing mechanism broadly described and claimed in the Seth B. Lindsey Patent No. 2,684,240, is utilized to provide the severed lengths 12' and apply them to the transfer wheel 60 (FIGURES 5 to 9, inclusive).

Referring to FIGURES 5, 6 and 7, a tape pull-off roller 61 having a knurled periphery, is rotatably mounted to withdraw an unsevered length of the tape 12 from a supply roll thereof (not shown), upon rotation of the roller in a clockwise direction, the roller being in peripheral driving connection with the tape by reason of the tape's temporary adherence to the periphery of the roller.

A tape-forming and projecting wheel 62 having a V-shaped circumferential groove 63 in its periphery (sometimes called a "V-wheel"), is rotatably mounted in a position to have the grooved portion of its periphery contacted by the adhesive side of the tape 12 that is fed to it by the roller 61. The groove of the wheel is knurled.

Adjacent the wheel 62 is a tape-forming guide in the form of a thin wheel 65 extending into the groove 63 and held in that position by a spring 66 which impels a guide-supporting bar 67 toward the wheel 62, the wheel 65 being rotatably mounted on the free end of the bar 67, and the bar 67 being rotatably held at its other end in a bearing member 68.

In operation, the tape 12 is first led from the supply around an idler roller 70, then around the pull-off roller 61 with the adhesive side contacting the periphery of the roller 61, and thence forwardly between the guide wheel 65 and the groove 63 of the tape-forming and projecting wheel 62 with the adhesive side contacting the groove.

Upon clockwise rotation of the roller 61, the tape is pulled off or withdrawn from the supply and fed to the wheel 62. Clockwise rotation of the wheel 62 draws the fed tape toward itself. As the tape moves toward the wheel 62 the guide wheel 65 bears or presses against the back of the tape in a manner to direct the tape into adhesive contact with the grooved portion of the periphery of the wheel 62 and to depress the tape into the groove 63.

The depression of the tape into the groove gives the tape a shape in cross section generally similar to the cross sectional shape of the groove, thus rendering the tape longitudinally ridged. The ridge extends along the tape's length for a distance on either side of its point of tangency to the wheel 62. This stiffens the tape enough so that it continues to thrust straight on after leaving the point of tangency and to pull loose from its adhesive contact with the wheel 62 instead of following the wheel 62 around.

As a result, the stiffened tape 12 is fed or thrust to the right away from the wheel 62 to provide an unsupported or free end portion in an applying position with the adhesive side facing the peripheral surface of the transfer wheel 60 to which a severed length 12' is to be applied.

The knurling on the groove 63 reduces the area of contact with the adhesive side of the tape and thus makes it easier for the stiffened tape to pull itself loose from the wheel 62 in the manner above described.

The loosening of the tape from the wheel 62 is additionally facilitated if the peripheral speed of the bottom of the groove 63 is slightly greater than that of the roller 61. To this end, the diameter of the wheel 62 at the bottom of the groove 63 is slightly larger than the diameter of the roller 61, and the roller 61 and the wheel 62 are rotated at the same speed.

The roller 61 and the wheel 62 are intermittently rotated clockwise by a reciprocating rack 71, a pinion 72 and three gears 74, 75 and 76.

The rack 71 is continuously reciprocated longitudinally in a fixed way 77, thereby oscillating the pinion 72. Through a one-way drive connection 78, the oscillating pinion 72 imparts intermittent clockwise rotation to the gear 74; and through the idler gear 75, the intermittent clockwise rotation of the gear 74 is transmitted to the gear 76. The gears 74 and 76 rotate in unison and with them the roller 61 and the wheel 62, respectively.

To the right of the above described tape withdrawing and projecting unit and above the projected portion of tape, is a tape-applying pad 80 facing the nonadhesive side of the tape and mounted in a way 81 for reciprocation downwardly toward the transfer wheel 60 and return. A first shear member 82 is fixed to the pad assembly at the left of the pad. A second shear member 83 that coacts with the shear member 82 to cut off the extended length of tape, is positioned below the tape adjacent the adhesive side of the tape.

FIGURE 8 shows the shear members 82 and 83 meeting to cut off the length 12' as the pad assembly moves downwardly, and FIGURE 9 shows the pad 80 applying the cut length to the peripheral surface of the transfer wheel 60 at the end of its downward stroke.

The tape applying wheel 26 and the transfer wheel 60 rotate continuously at equal peripheral speeds, and the rate of application of the successive lengths 12' of tape to the wheel 60 is timed in relation to the movement of the web 45 so as to apply the lengths to the web at the desired intervals.

FIGURE 10 shows a further alternative form which employs the tape withdrawing and projecting unit of FIGURE 5, 6 and 7 to supply or feed the unsevered tape 12 directly to the applying wheel 26 where it is cut into the desired lengths 12' by the cutter wheel 50 previously described in connection with FIGURE 2. For an intermittent feed of the unsevered tape 12 to the wheel 26, the rack 71 and pinion 72 are employed as shown in FIGURES 5 and 6. For a continuous feed, the gear 74 is continuously rotated by direct connection to a power means (not shown).

Numerous other alternatives, equivalents and variations within the scope of the invention as herein described and/or claimed, may be employed and are contemplated.

As shown in FIGURE 11, the article to a surface of which the length 12' of tape is to be applied, may be a carton 45', one or more lengths 12' being applied to the upper surface of each of a series of the cartons as they are successively moved past the tape applying wheel 26 in the direction of the arrow 46 by a conveyor belt 85.

We claim:

1. Apparatus for applying a severed length of adhesive tape to a surface of an article that is in motion, comprising means for moving an article to be taped through a tape applying station, a metallic continuously rotating tape applying roll having a continuous cylindrical peripheral surface of substantially constant radius of curvature disposed for rolling engagement with a surface of an article at said tape applying station, said peripheral surface being formed with spaced aperture means throughout the circumferential extent thereof, a source of adhesive tape having a free end portion trained adhesive side out circumferentially around a portion of said peripheral surface in advance of the portion of said peripheral surface engageable with an article at the tape applying station, vacuum means within said tape applying roll acting through said peripheral aperture means and tending to cause said tape to adhere to said peripheral surface and to travel therewith, feed means normally preventing movement of said tape with and at the same rate as said peripheral surface such that said tape normally has sliding engagement with said peripheral surface, and tape severing means movable from a retracted position to a severing position with respect to said terminal portion of said tape while said portion is slidingly engaged with said peripheral surface to thereby sever a terminal extent of said tape which severed extent is thereupon carried by said roll at the peripheral speed thereof to said tape applying station where it is rolled onto a surface of an article moving through said tape applying station.

2. Apparatus for applying a severed length of adhesive tape to a surface of an article that is in motion, comprising means for moving an article to be taped through a tape applying station, a metallic continuously rotating tape applying roll having a continuous cylindrical peripheral surface of substantially constant radius of curvature disposed for rolling engagement with a surface of an article at said tape applying station, said peripheral surface being formed with spaced aperture means throughout the circumferential extent thereof, a source of adhesive tape having a free end portion trained adhesive side out circumferentially around a portion of said peripheral surface in advance of the portion of said peripheral surface engageable with an article at the tape applying station, vacuum means within said tape applying roll acting through said peripheral aperture means and tending to cause said tape to adhere to said peripheral surface and to travel therewith, feed means normally preventing movement of said tape with and at the same rate as said peripheral surface such that said tape normally has sliding engagement with said peripheral surface, and a tape severing blade movable from a retracted position to a severing position in contact with a metallic portion of said peripheral surface overlaid by and with which said terminal portion of said tape is slidingly engaged to thereby sever a terminal extent of said tape which severed extent is thereupon carried by said roll at the peripheral speed thereof to said tape applying station where it is rolled onto a surface of an article moving through said tape applying station.

3. Apparatus for applying a severed length of adhesive tape to a surface of an article that is in motion, comprising means for moving an article to be taped through a tape applying station, a metallic continuously rotating tape applying roll having a continuous cylindrical peripheral surface of substantially constant radius of curvature disposed for rolling engagement with a surface of an article at said tape applying station, said peripheral surface being formed with spaced aperture means throughout the circumferential extent thereof, a source of adhesive tape having a free end portion trained adhesive side out circumferentially around a portion of said peripheral surface in advance of the portion of said peripheral surface engageable with an article at the tape applying station, vacuum means within said tape applying roll acting through said peripheral aperture means and tending to cause said tape to adhere to said peripheral surface and to travel therewith, feed means comprising a power driven feed drum having a knurled peripheral surface disposed between said source and said tape applying roll and around which said tape is trained at least 90° with the adhesive side thereof contacting said knurled surface, said drum when rotated being operable to withdraw tape from said source, and said knurled surface affording reduced area contact with the adhesive side of said tape such that upon rotation of said drum the action of said vacuum means on said tape peels said tape from said drum and draws said tape around said tape applying roll, said drum normally preventing movement of said tape with and at the same rate as the peripheral surface of said roll such that said tape normally has sliding engagement with said last-mentioned peripheral surface, and tape severing means movable from a retracted position to a severing position with respect to said terminal portion of said tape while said portion is slidingly engaged with said peripheral surface to thereby sever a terminal extent of said tape which severed extent is thereupon carried by said roll at the peripheral speed thereof to said tape applying station where it is rolled onto a surface of an article moving through said tape applying station.

References Cited in the file of this patent

UNITED STATES PATENTS

| | | |
|---|---|---|
| 1,874,224 | Barnett et al. | Aug. 30, 1932 |
| 2,289,336 | Bamford | July 14, 1942 |
| 2,543,004 | Dewyer | Feb. 27, 1951 |
| 2,543,220 | Ardell | Feb. 27, 1951 |